United States Patent
Fouts et al.

(10) Patent No.: US 8,332,473 B1
(45) Date of Patent: Dec. 11, 2012

(54) SYSTEM AND METHOD FOR MANAGING MULTIPLE MESSAGE FORMAT COMMUNICATION

(75) Inventors: Monty Fouts, Fort Worth, TX (US); Richard Bowman, Grapevine, TX (US); Mark Hanson, Flower Mound, TX (US)

(73) Assignee: American Airlines, Inc., Fort Worth, TX (US)

( * ) Notice: Subject to any disclaimer, the term of this patent is extended or adjusted under 35 U.S.C. 154(b) by 1906 days.

(21) Appl. No.: 11/119,787

(22) Filed: May 2, 2005

(51) Int. Cl.
*G06F 15/16* (2006.01)

(52) U.S. Cl. .......................................... 709/206; 709/245

(58) Field of Classification Search .................. 709/206
See application file for complete search history.

(56) References Cited

U.S. PATENT DOCUMENTS

| | | | |
|---|---|---|---|
| 5,390,314 A | | 2/1995 | Swanson |
| 5,574,934 A | * | 11/1996 | Mirashrafi et al. ............ 709/207 |
| 5,652,759 A | | 7/1997 | Stringfellow, Jr. |
| 6,334,140 B1 | * | 12/2001 | Kawamata .................... 709/202 |
| 6,707,472 B1 | * | 3/2004 | Grauman ...................... 715/752 |
| 2002/0133566 A1 | * | 9/2002 | Teeple .......................... 709/218 |
| 2002/0198747 A1 | * | 12/2002 | Boyer et al. ..................... 705/5 |
| 2003/0115272 A1 | | 6/2003 | Muttitt et al. |
| 2003/0140131 A1 | * | 7/2003 | Chandrashekhar et al. .. 709/223 |
| 2005/0005116 A1 | * | 1/2005 | Kasi et al. ..................... 713/170 |
| 2005/0010644 A1 | * | 1/2005 | Brown et al. ................. 709/206 |
| 2005/0038863 A1 | * | 2/2005 | Onyon et al. ................. 709/207 |
| 2005/0246193 A1 | * | 11/2005 | Roever et al. ..................... 705/1 |
| 2006/0112139 A1 | * | 5/2006 | Maple et al. ............... 707/104.1 |

\* cited by examiner

*Primary Examiner* — John Macilwinen
(74) *Attorney, Agent, or Firm* — Haynes and Boone, LLP

(57) ABSTRACT

A system and method for managing multiple message format communication that may provide the ability to route, transform, and augment inbound messages, so that virtually any outbound message may be constructed.

35 Claims, 11 Drawing Sheets

SYSTEM AND METHOD FOR MANAGING MULTIPLE MESSAGE FORMAT COMMUNICATION

BACKGROUND

This invention relates to a system and method for accommodating communications between sources having different message formats, more particularly, to a flexible messaging platform that will facilitate the interchange of data between a diverse set of applications.

Many companies utilize data originating from several sources. The sources can include proprietary applications, customized applications, and off-the-self standard applications. As technology advances, a company needs to be able to take advantage of new or different applications without compromising the performance of existing applications. Therefore, companies are focusing on ways to integrate and implement new technology.

DETAILED DESCRIPTION

Figure 1:
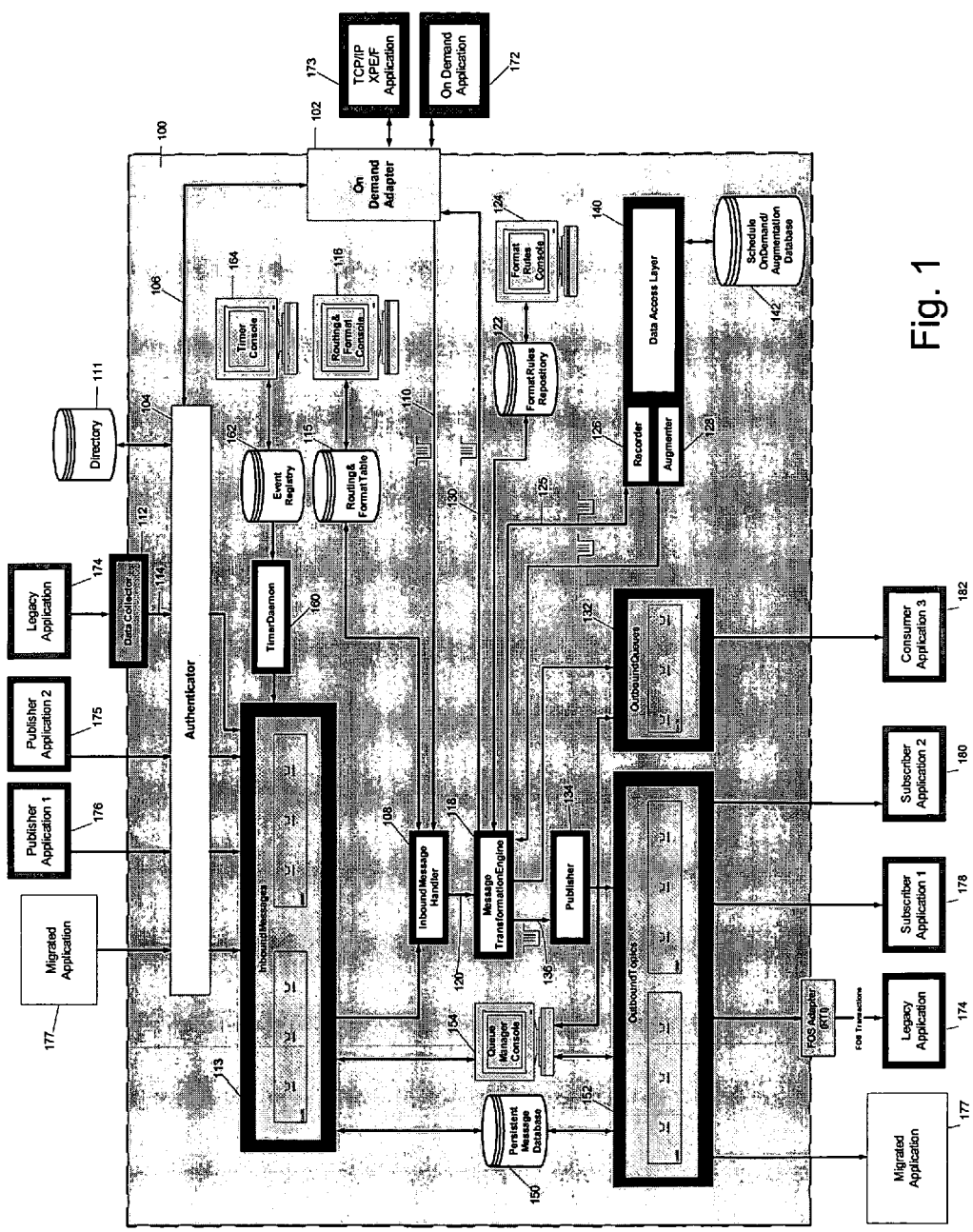
FIG. 1 is a schematic illustration of at least a portion of an exemplary embodiment of a system for managing multiple message format communication.

The following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, while many of the examples provided below pertain to transactions often conducted in the course of airline industry business, aspects of the present disclosure are applicable and/or readily adaptable to other industries, including rail, bus, cruise and other travel or shipping industries, rental car industries, hotels and other hospitality industries, entertainment industries, and others.

Referring initially to FIG. 1, at least a portion of an exemplary embodiment of a message handling system 100 for handling messages between different applications is illustrated. System 100 includes on-demand adapter 102, which is operably coupled to authenticator 104 through queue 106 and inbound message handler (IMH) 108 through IMH queue 110. The authenticator 104 is also operably coupled to directory 111, data collector 112 through collector queue 114 and inbound messages queue 113.

IMH 108 is operably coupled to a routing and format table (RAFT) 115, which is operably coupled to a routing and format console 116. IMH 108 is also operably coupled to the inbound message queue 113, as well as a message transformation engine (MTE) 118 through an MTE queue 120. The MTE 118 is operably connected to the format rules repository 122 (which is operably connected to format rules console 124), a recorder 126, an augmenter 128, the on demand adapter 102 (through response queue 130), outbound queues 132, and a publisher 134 (through a publishing queue 136).

Recorder 126 and the augmenter 128 are both operably coupled to a data access layer (DAL) 140, which is operably coupled to a scheduled/on-demand/augmentation (SODA) database 142.

Inbound messages queue 113 is also operably connected to a persistent message database 150, a queue managers console 154, and the timer daemon 160. The persistent message database 150 is operably coupled to an outbound topics queue 152. In addition, the queue managers console 152 is also operably coupled to the outbound topics queue 152 and the outbound queues 132.

Timer daemon 160 is operably coupled to an event registry 162. The event registry 162 is operably coupled to a time console 164.

In an exemplary embodiment, during operation of the system 100, the system 100 may interface with and provide communication between many types of sources, such as on-demand applications 172, internet-based or Windows XP-based applications 173, legacy applications 174, publisher applications 175 and 176, migrated applications 177, subscriber applications 178 and 180, and consumer applications 182. In addition to application, sources may also include other modules capable of submitting and receiving requests, events, and data. In an exemplary embodiment, the system 100 may interface and provide communication between many applications in a flight operations system for an airline, which may include applications directed to flight planning management, maintenance and engineering management, crew allocation management, and cargo management. The system 100 may accommodate communication between different types of applications regardless of the application communication protocol and data format.

Figure 2:
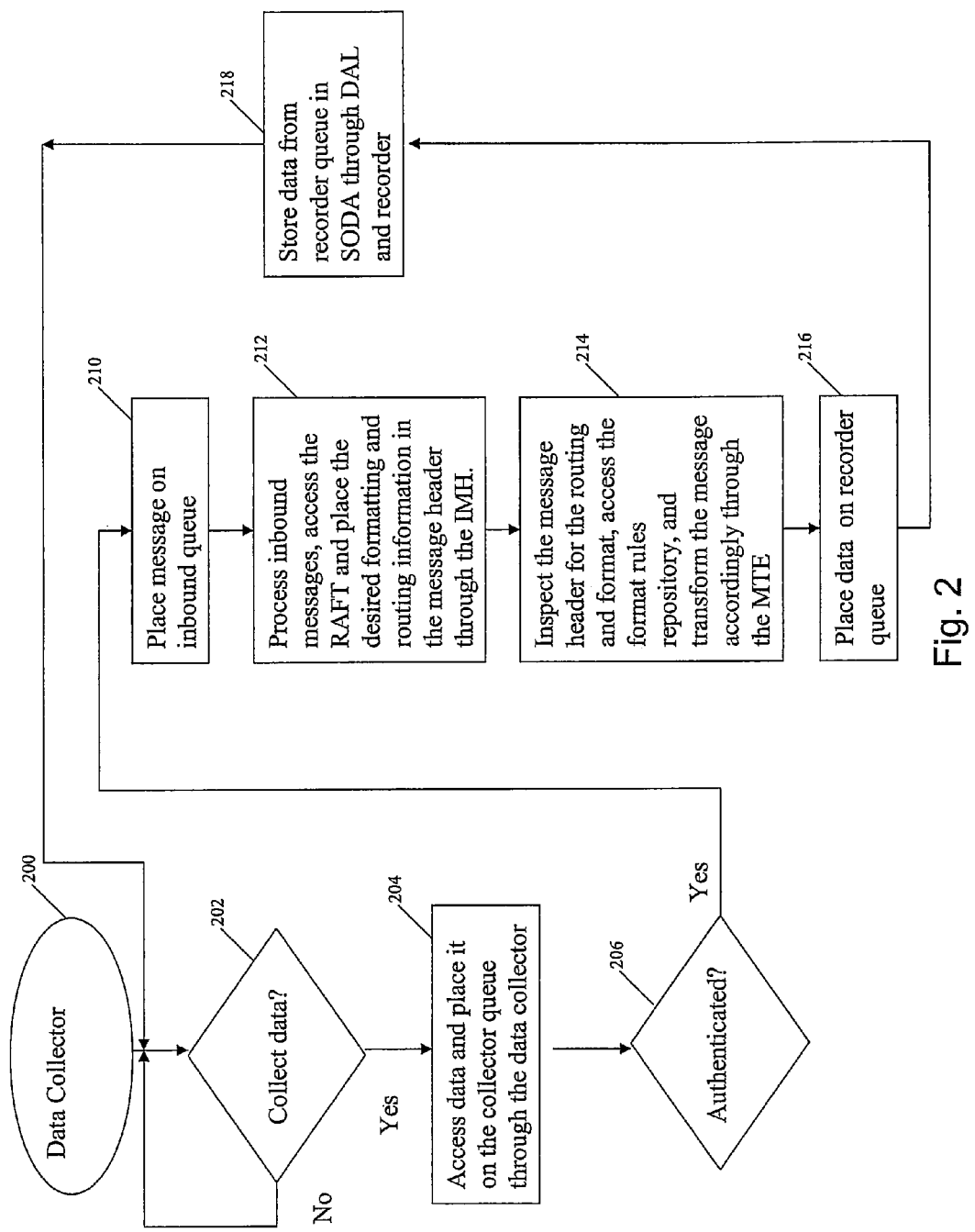
FIG. 2 is a flow chart illustration of at least a portion of an exemplary embodiment of a process for collecting data for the system of FIG. 1.

Referring to FIG. 2, during operation of system 100, in an exemplary embodiment, a method 200 of populating the SODA 142 with data from applications is illustrated. The system 100 may be adapted to receive data from a source application, such as a legacy application 174. The legacy application outputs data, which is received by data collector 112, step 202. Once the data is received, a message including the data is placed on collector queue 114, step 204. In one embodiment, the message may be authenticated to verify that it originated from an authorized source application, as well as to verify that the message contains the appropriate parameters, step 206. The message is placed on inbound message queue 113, step 210.

IMH 108 processes the message from the inbound message queue 113, step 212. In one embodiment, IMH 108 processes the messages on a first in, first out basis. In a further embodiment, IMH 108 accesses the routing and formatting table (RAFT) 115 to gather information related to the format of the data to be stored the SODA database 142, and may also receive routing information for outbound messages. In one embodiment, IMH 108 places the gathered information into a header of the message. The message is sent to MTE 118, step 213.

MTE 118 may inspect the message header for the routing and format information, step 214. The format information may be used to access the format rules repository 122 to gather the formatting rules that may be used by MTE 118 to transform the message into the appropriate format. MTE 118 also may send the transformed message to recorder 126 through recorder queue 125, step 216. The data within the transformed message is stored in SODA database 142, step 218.

Figure 3:
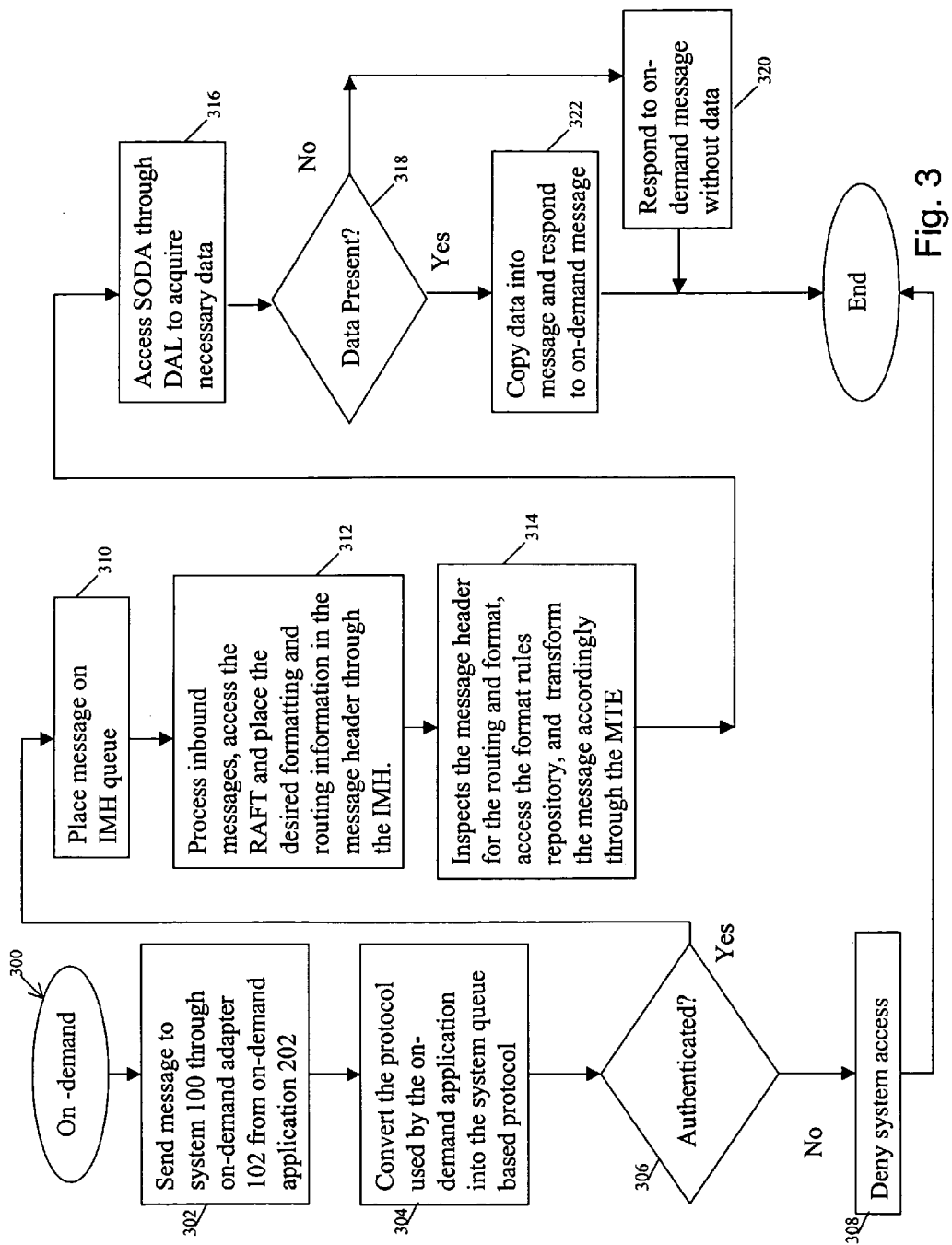
FIG. 3 is a flow chart illustration of at least a portion of an exemplary embodiment of a process for managing on-demand messages in the system of FIG. 1.

Referring to FIG. 3, during operation of system 100, in an exemplary embodiment, a method 300 of processing inbound messages or requests from an on-demand application 172 is illustrated. The on-demand application 172 sends a message to the system 100 through the on-demand adapter 102, step 302. The on-demand adapter 172 may handle inbound messages from applications requesting data and may convert the protocol used by the on-demand application 172 into a conventional queue based protocol used in system 100, step 304. In one embodiment, the message may be authenticated to verify that it originated from an authorized source application, as well as to verify that the message contains the appropriate parameters, step 306. If on-demand application 172 is not authorized, then on-demand adapter 102 may deny the requesting application access to system 100, step 308. If on-demand application 172 is authorized, then on-demand adapter 102 may place the converted message on IMH queue 110, step 310.

IMH 108 processes the message from the inbound message queue 113, step 312. In one embodiment, IMH 108 processes the messages on a first in, first out basis. In a further embodiment, IMH 108 accesses the routing and formatting table (RAFT) 115 to gather information related to the outbound message to respond to the on-demand request. For example, the information may include the following: (1) the appropriate format of the outbound message associated with the on-demand request, such as whether the outbound message requires data; (2) the destination or destinations for the outbound message (in the case of an on-demand request, the destination may be a temporary queue that directs the response back to the on-demand adapter 102); (3) back-up or redundancy requirements for the outbound message; and/or (4) the priority of the outbound message. In one embodiment, IMH 108 places the gathered information into a header of the message. The message is sent to MTE 118, step 313.

MTE 118 may inspect the message header for the routing and format information, step 314. The format information may be used to access the format rules repository 122 to gather the formatting rules that may be used by MTE 118 to transform the message into the appropriate outbound message. MTE 118 also may access augmenter 128 to gather data from SODA database 142, step 316. If the requisite data is not present in SODA database 142, step 318, then MTE 118 may deliver the outbound message without the requisite data, step 320. If the data is present, step 318, then MTE may copy the data from SODA database 142 into an outbound message formatted in accordance with the rules associated with the on-demand request message defined in format rules repository 122 and place the augmented outbound message on the response queue 130, step 322.

Figure 4:
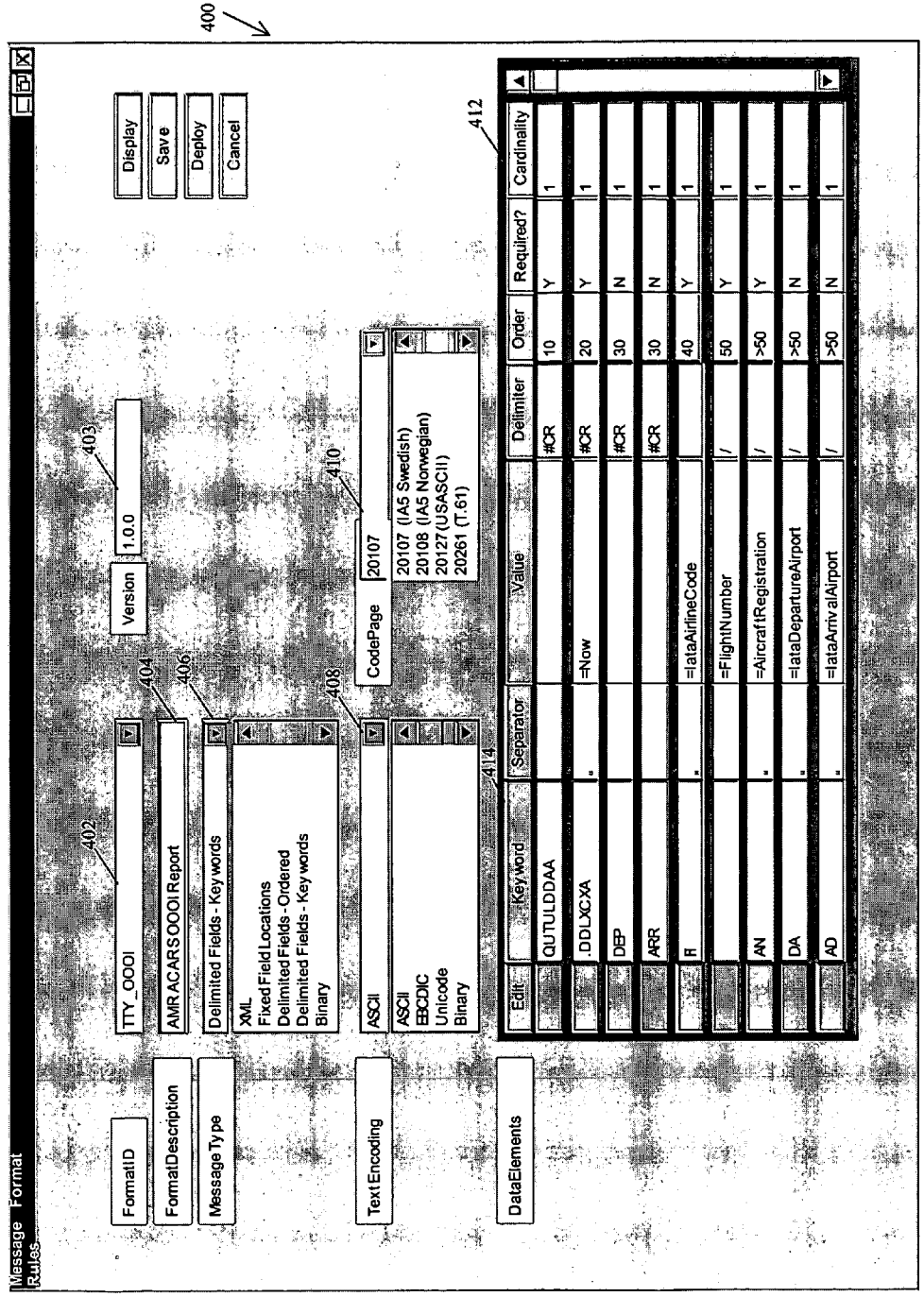
FIG. 4 is an illustration of at least a portion of an exemplary embodiment of the message rules format of the system of FIG. 1.

Referring to FIG. 4, in an exemplary embodiment, a format rules repository entry screen 400 is illustrated. Each inbound message may be associated with a desired outbound message format, which may be defined by the format identification code 402, version 403 and/or format description 404. Options for outbound message format rules may include any desired format indicator, such as, for example, message type 406, text encoding 408, codepage 410 and data elements 412. The message type 406 may define the message type format, such as XML, fixed field locations, delimited fields—ordered, delimited fields—key words, or binary. The text encoding 408 may define the text type format, such as, for example, ASCII, EBCDIC, Unicode or binary. The codepage 410 may define the message format language, such as, for example, Swedish, Norwegian, USASCII or T.61. The data elements 412 may specify a desirable data format characteristic, such as each data element. In one embodiment, the outbound message format may use keywords, separators, values, delimiters, order values (i.e. relative position within a message), a required boolean, and cardinality (i.e., how many occurrences of the data element can appear in the message.

Figure 5:
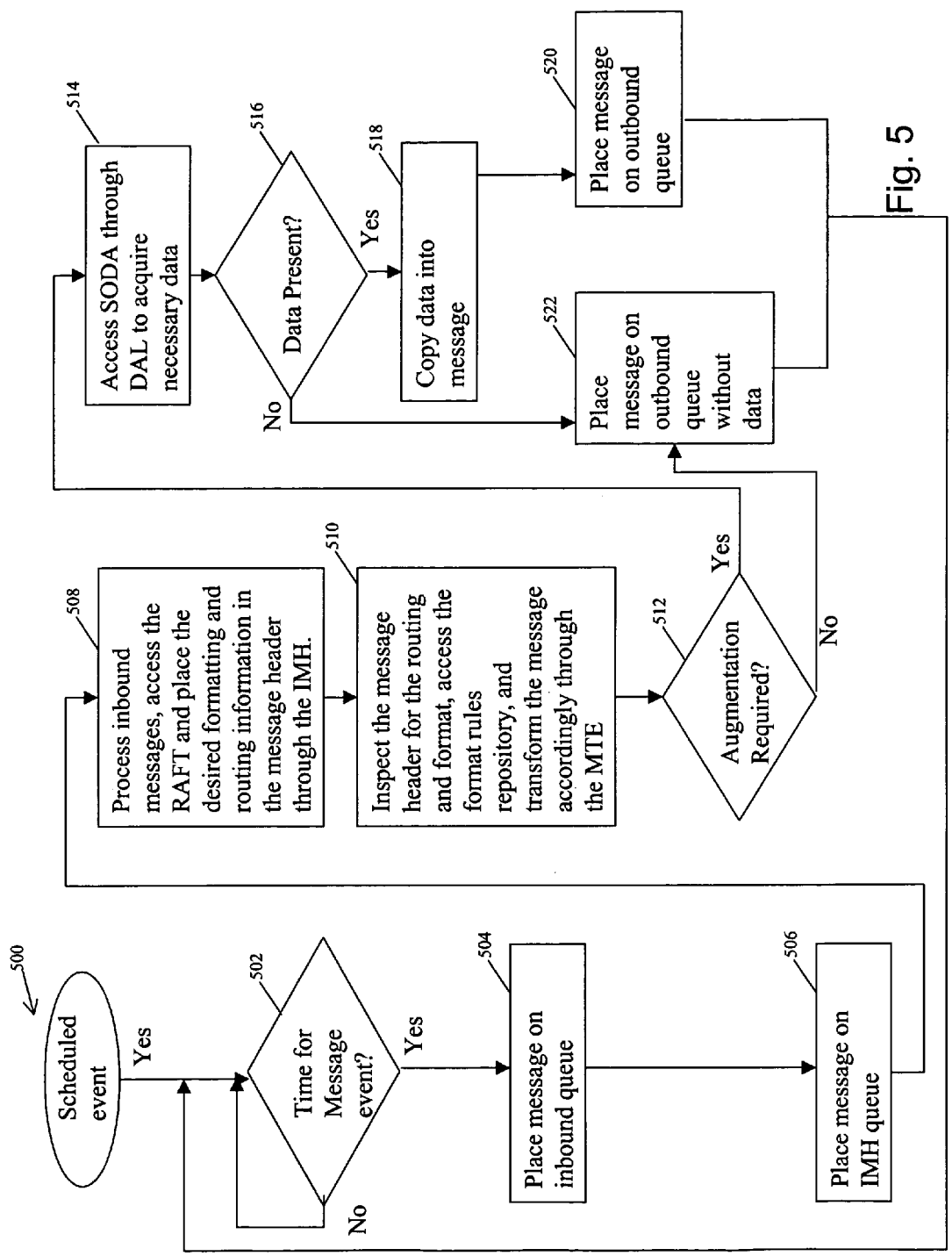
FIG. 5 is a flow chart illustration of at least a portion of an exemplary embodiment of a process for managing scheduled event messages in the system of FIG. 1.

Referring to FIG. 5, during operation of system 100, in an exemplary embodiment, a method 500 of processing scheduled events is illustrated. The scheduled events may be stored in the event registry 162, which may contain a schedule of events that may result in outbound messages being generated, step 501. The system 100 may determine when a predefined scheduled event may occur, step 502, through the timer daemon 160, which monitors the event registry 162 and at the appropriate time triggers the desired event. When the appropriate event is triggered, the system 100 may place a scheduled message on inbound message queue 113, step 504. The system 100 may also place the scheduled message on IMH queue 110, step 506.

IMH 108 processes the message from the inbound message queue 113, step 508. In one embodiment, IMH 108 processes the messages on a first in, first out basis. In a further embodiment, IMH 108 accesses the routing and formatting table (RAFT) 115 to gather information related to the outbound message to respond to the on-demand request. For example, the information may include the following: (1) the appropriate format of the outbound message for the scheduled event, such as, for example, whether the outbound message requires data; (2) the destination or destinations for the outbound message; (3) back-up or redundancy requirements for the outbound message; and/or (4) of the priority of the outbound message. In one embodiment, IMH 108 places the gathered information into a header of the message. The message is sent to MTE 118, step 509.

MTE 118 may inspect the message header for the routing and format information, step 510. The format information may be used to access the format rules repository 122 to gather the formatting rules that may be used by MTE 118 to transform the message into the appropriate outbound message. MTE 118 may determine from the formatting information whether additional data is necessary for the outbound message, step 512.

If data is required, MTE 118 may access the augmenter 128 to gather data from SODA database 142, step 514. If the data is present in SODA database 142, step 516, then MTE may copy the data from SODA database 142 into an outbound message formatted in accordance with the rules associated with the message defined in format rules repository 122, step 518, and place the augmented outbound message on the outbound queue 132, step 520.

If data is not required at step 512, or the requisite data is not present in SODA database 142 at step 516, then MTE 118 may deliver the outbound message without the requisite data, step 522.

Figure 6A:
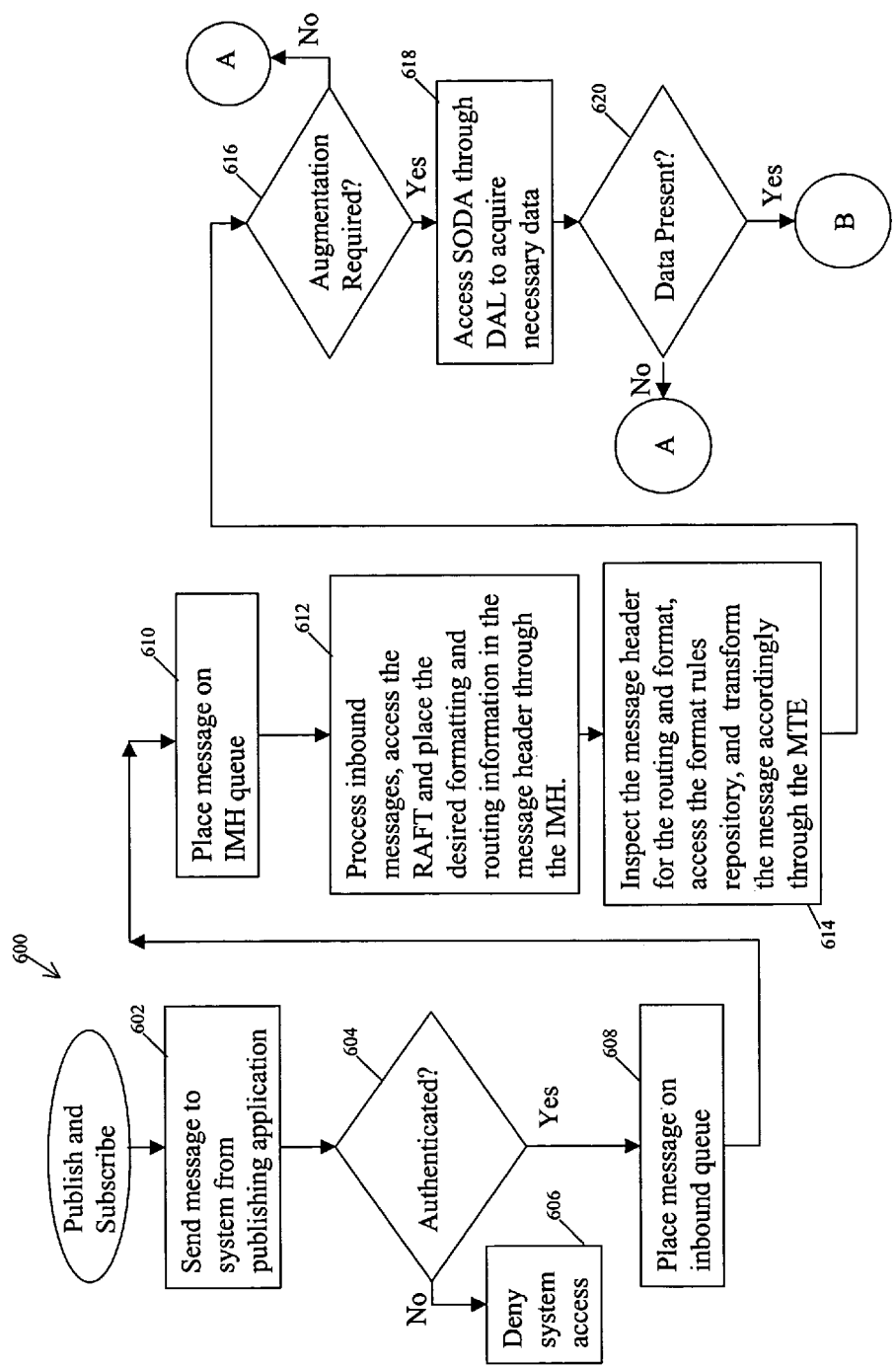
FIGS. 6a and 6b are flow chart illustrations of at least a portion of an exemplary embodiment of a process for managing publish and subscribe messages in the system of FIG. 1
Figure 6B:
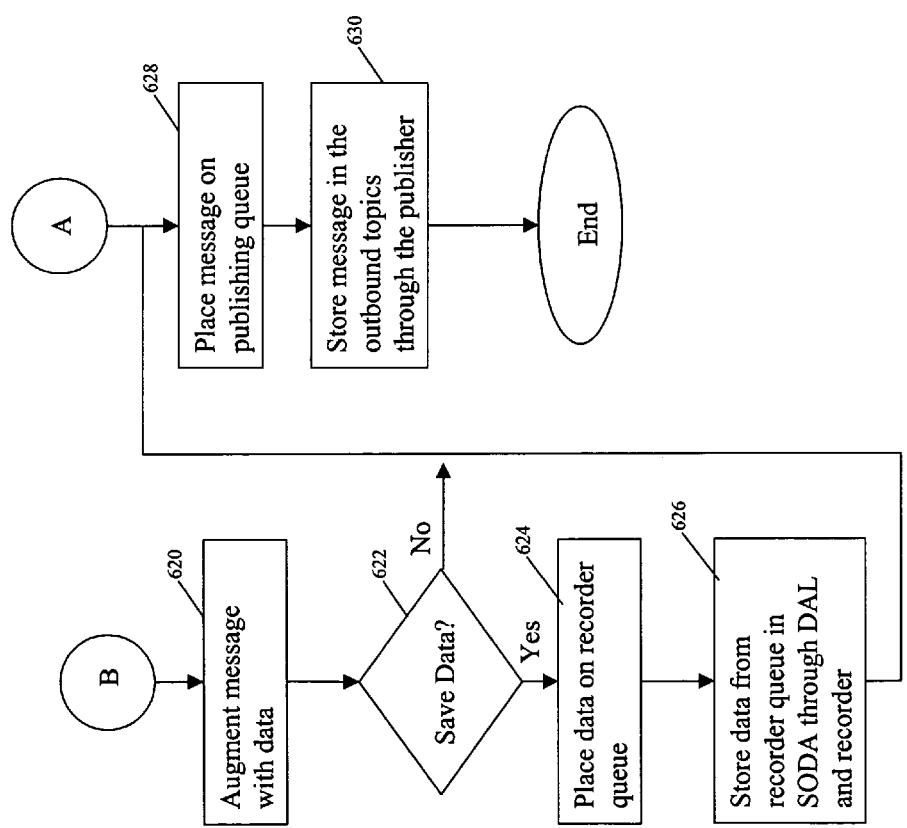

Referring to FIGS. 6a and 6b, during operation of system 100, in an exemplary embodiment, a method 600 of processing inbound messages from the publishing application 175, 176 is illustrated. The publishing application 175, 176 may send a message to system 100, step 602. Authenticator 104 may verify that the publishing application 175, 176 is authorized to access the system 100, step 604. If the publishing application 175, 176 is not authorized, then the system 100 may deny the publishing application access to system 100, step 606. If the publishing application 175, 176 is authorized, then the system 100 may place the message on the inbound message queue 113, step 608. The message may also be placed on IMH queue 110, step 610.

IMH 108 processes the message from the inbound message queue 113, step 612. In one embodiment, IMH 108 processes the messages on a first in, first out basis. In a further embodiment, IMH 108 accesses the routing and formatting table (RAFT) 115 to gather information related to the outbound message responding to the publishing application 175, 176. For example, the information may include the following: (1) the appropriate format of the outbound message for the publishing application 175, 176, such as whether the outbound message requires data; (2) the destination or destinations for the outbound message; (3) back-up or redundancy requirements for the outbound message; and/or (4) of the priority of the outbound message. In one embodiment, IMH 108 places the gathered information into a header of the message. The message is sent to MTE 118, step 613.

MTE 118 may inspect the message header for the routing and format information, step 614. The format information may be used to access the format rules repository 122 to gather the formatting rules that may be used by MTE 118 to transform the message into the appropriate outbound message. MTE 118 may determine from the formatting information whether additional data is necessary for the outbound message, step 616.

If data is required, MTE 118 may access the augmenter 128 to gather data from SODA database 142, step 618. If the data is present in SODA database 142, step 620, then MTE may copy the data from SODA database 142 into an outbound message formatted in accordance with the rules associated with the message defined in format rules repository 122, step 622. The MTE 118 also may determine whether any data from the inbound publishing application should be stored in SODA database 142, step 622. If data should be stored, then MTE 118 may send the message to the recorder 126 through the recorder queue 125, step 624, to store data in SODA database 142, step 626. Once the data is stored in SODA database 142, then MTE 118 may send the augmented publishing application message through publishing queue 136 to publisher 134, which controls the publishing service, step 628.

The publisher 134 stores the outbound messages in the outbound topics area 152 that may include a collection of related events to which a subscribing application can subscribe, step 630. A subscribing application may be one that receives update by subscribing to one or more system 100 topics.

If data is not required at step 616, or the requisite data is not presented in SODA database 142 at step 620, then MTE 118 may deliver the outbound message without data to the publishing queue 136.

In an exemplary embodiment, SODA database 142 may be populated by any type of data that may be requested from any application connected the system 100 at any time. For example, if a new requesting application requires specific data from legacy application 174 that is not stored in SODA database 142, then method 200 may be modified to collect and store the specific data during the data collection process. The system 100 may be may collect data at predetermined times, on demand or on an "ad-hoc" basis by, for example, subscribing to events generated from a publishing application.

In an exemplary embodiment, on-demand application 172 may be any application requesting action from system 100. For example, on-demand application 172 may request data from another application interfacing to system 100, such as, for example, legacy application 174, publisher application 176 or migrated application 177. The on-demand application 172 may also request system 100 to deliver messages to other applications.

In an exemplary embodiment, on-demand adapter 102 may be adapted to provide protocol adaptation for any type of on-demand applications or clients and any type of socket connection requests, such as, for example, TCP/IP socket connection requests. In an exemplary embodiment, on-demand adapter 102 may be programmed to accept certain types of on-demand requests and reject certain types of or unknown on-demand requests.

In an exemplary embodiment, there may a separate IMH queue 110 for each type of on-demand application request, such that like messages or requests are directed to the appropriate IMH queue 110 by the on-demand adapter 102. In another exemplary embodiment, where only a single IMH queue 110 is used, in addition to converting the protocol used by the on-demand application into a conventional queue based protocol used in system 100, on-demand application 172 may add a message source identifier to the message prior to sending the messages to IMH queue 110.

In an exemplary embodiment, the message format rules in format rules repository 122 may include any information necessary to format the requested outbound message. The format rules console 124 may be used to alter the format rules.

In an exemplary embodiment, a scheduled event may be any event which would require the dissemination of information to various outbound message destinations, such as in the airline industry, a crew management application may need information about flight schedules from a flight planning management application on a periodic basis to be able to schedule crew support for the scheduled flights. A maintenance and engineering application may also need information about flight schedules from a flight planning management application on a periodic basis to be able to schedule maintenance for the airplanes. Scheduled events may generate outbound messages periodically or in response to a request.

In an exemplary embodiment, a publishing application may be any application that presents information to system 100 that subscribing applications want to receive. Publishing applications may present messages to system 100 at any time or on a periodic basis.

In an exemplary embodiment, system 100 may be adapted to store all or any inbound messages, including on-demand messages, in persistent message database 150 to provide message redundancy in the case of a system failure. The RAFT 115 may dictate which messages should be stored in the persistent message database 150 so that a copy of the message is retained while the message is on queue.

In an exemplary embodiment, routing and format console 116 may provide the ability to add, edit, delete and maintain entries to the RAFT 115. RAFT 115 may authenticate a user and may or may not validate entered data. In an exemplary embodiment, RAFT 115 may include the information presented in the following table for each message type:

| Field | Java Type | Range | Definition |
|---|---|---|---|
| Title | String | A-Z, a-z, 0-9 | Title of the message |
| ID | String | A-Z, a-z, 0-9 | ID for the message |
| Instances | int | 0-n | ID for the instances |
| Priority | int | 0-n | Defines the handling priority of the message |
| Persistent | boolean | true/false | Determines whether the message should be backed-up on disk while on queue. |
| Inbound and Outbound Format ID | String | A-Z, a-z, 0-9 | Unique name for the inbound and outbound formats |
| Destination Name | String | A-Z, a-z, 0-9 | Name of the queue to which the outbound messages are written |
| Destination Type | String | Q (Queue), T (Topic), R (Reply-To Queue) | For direct output to a single destination, the desintation type will be queue (Q). for output to subscribing applications, the destination type will be topic (T). For responses to on-demand requests, the destination type will be reply-to queue (R). |

In one embodiment, the information in the table may be validated by the RAFT configuration manager.

Figure 7:
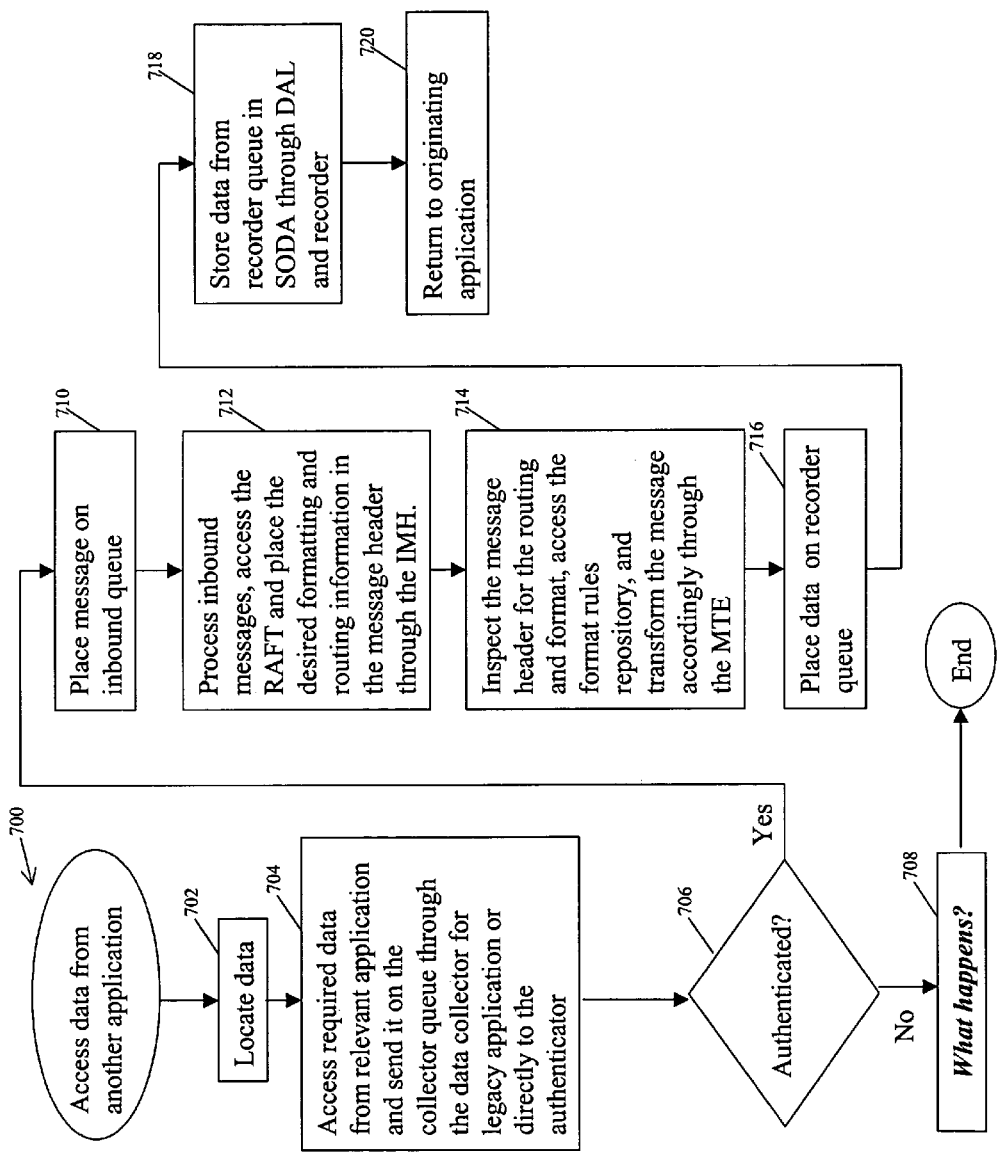
FIG. 7 is a flow chart illustration of at least a portion of an exemplary embodiment of a process for accessing data from other applications interfaced to the system of FIG. 1.

Variations may be made in the foregoing without departing from the scope of the present disclosure. In an exemplary embodiment, referring to FIG. 7, any of the methods 300, 500, and 600 may be modified at steps 318, 516 and 620, respectively, to incorporate the process 700, which may allow system 100 to access data that is not present in SODA database 142 from another location, such as another application interfaced to the system 100. System 100 determines where the data is located, step 702. System 100 accesses the required data from the relevant application and the data is sent in an inbound message format to on collector queue 114 through data collector 112 for legacy applications or directly to the authenticator 104 for non-legacy application, steps 704. In one embodiment, the message may be authenticated to verify that it originated from an authorized source application, as well as to verify that the message contains the appropriate parameters, step 706. The converted message is placed on inbound message queue 113, step 708.

IMH 108 processes the message from the inbound message queue 113, step 710. In one embodiment, IMH 108 processes the messages on a first in, first out basis. In a further embodiment, IMH 108 accesses the routing and formatting table (RAFT) 115 to gather information related to the format of the data to be stored the SODA database 142, and may also receive priority, persistence, and routing information for outbound messages. In one embodiment, IMH 108 places the gathered information into a header of the message. The message is sent to MTE 118, step 712.

The MTE 118 may inspect the message header for the routing and format information, step 714. The format information may be used to access the format rules repository 122 to gather the formatting rules that may be used by MTE 118 to transform the message into the appropriate format. MTE 118 also may send the transformed message to recorder 126 through recorder queue 125, step 716. The data within the transformed message is stored in SODA database 142, step 718.

In an exemplary embodiment, from a functional perspective, the system 100 may provide the ability to route, transform, and augment inbound messages so that virtually any outbound message may be constructed. Inbounds message may be either data content or may be a command requesting data.

In an exemplary embodiment, the system 100 may be implemented on any conventional hardware, such as, for example, any conventional computing device. For the sake of example, a conventional computing device may include a central processing unit (CPU), a memory unit, an input/output (I/O) device, and an external interface. For example, the CPU may actually represent a multi-processor or a distributed processing system; the memory unit may include different levels of cache memory, main memory, hard disks, and remote storage locations; and the I/O device may include monitors, keyboards, and the like. The external interface may be, for example, a modem, a wireless transceiver, and/or one or more network interface cards (NICs). In an exemplary embodiment, the computing device may be one or more Sun 4900 servers running the Solaris operation system from Sun Microsystems of California, which may be integrated to provide system 100 redundancy and fault tolerance.

In an exemplary embodiment, the system 100 may interface with any external applications, such as, for example, on-demand applications 172, internet based or Windows XP based applications 173, legacy applications 174, publisher applications 175 and 176, migrated applications 177, subscriber applications 178 and 180, and consumer applications 182, through any conventional network. The network may be a single network or may be a variety of different networks, such as an intranet and the Internet, and may include both wireline and wireless communication channels. An intermediate network may also be utilized, such as, for example, a complete network or a subnet of a local area network, a company wide intranet, and/or the Internet. Each entity or element may be identified by an address or a combination of addresses, such as a media control access (MAC) address associated with a network interface and an Internet protocol (IP) address.

In an exemplary embodiment, the system 100 external interfaces and internal implementation may be based on open, industry standard technologies, allowing for ease of integration and for future extension. The architecture of the system 100 may allow for the integration of multiple architectures and distributed systems.

In an exemplary embodiment, the system 100 may utilize any conventional programming techniques, such as, for example, Java, and any conventional software, such as, for example, conventional enterprise middleware, databases and clustering software. In an exemplary embodiment, the Web-Sphere middleware suite from International Business Machines of New York, such as, for example, WebSphere Business Integration Message Broker, WebSphere MQ, and WebSphere Application Server may be used as the enterprise middleware. In an exemplary embodiment, the database may be any conventional database distributed by Oracle of California, such as, for example, the Oracle database Enterprise Edition 9.x. In an exemplary embodiment, Veritas Cluster Server distributed by Veritas Software Corporation of California may be used for clustering.

In an exemplary embodiment, the directory 111 in system 100 may be an internal directory service for looking up internal resources such as queue names, topic names and distributed objects, such as, for example, Enterprise JavaBeans.

Additionally, services and applications external to system 100 may be stored in a separate directory, which may aid in the authentication and authorization of applications and clients. A web application server may also be used to deploy the inbound message handler and data collectors.

In an exemplary embodiment, components within system 100 communicate through a Java Native Interface (JNI) 610, the native programming interface for Java, which is distributed with standard Java Development Kit (JDK) from Sun Microsystems of California. System 100 may also utilize JDBC technology, which may be an application program interface (API), included in Java 2 Platform, Standard Edition (J2SE) and Java 2 Platform, Enterprise Edition (J2EE) releases, that provides cross-DBMS, connectivity to a wide range of SQL databases and other tabular data sources, such as spreadsheets or flat files. DBMS is a database management system.

In an exemplary embodiment, system 100 may also utilize: conventional Java Message Service (JMS), a messaging standard that allows application components based on J2EE to create, send, receive, and read messages; MQ, which is a messaging platform developed by International Business Machines Corporation of New York that provides Java and JMS interfaces; and MQSeries middleware that provides an asynchronous communications function for application to application connection.

In an exemplary embodiment, the RAFT 115 user interface may be a J2EE web application that provides the ability to add, edit and maintain entries to the RAFT 115. The RAFT configuration manager may validate edits to existing entries and new entries with one or more outbound formats using a combination of JavaScript and Java Server Faces validation components.

Figure 8:
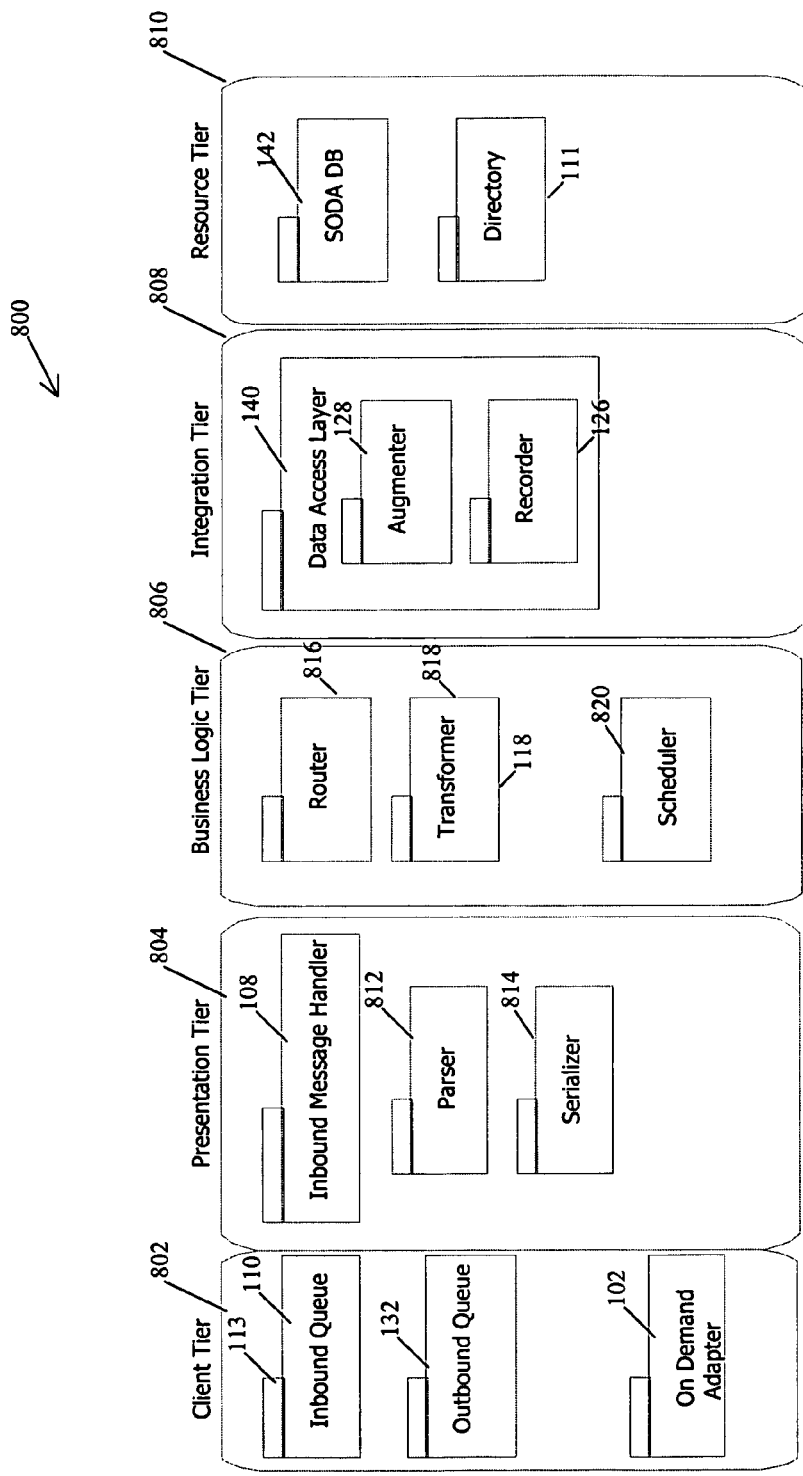
FIG. 8 is schematic illustration of at least a portion of another exemplary embodiment of the system for managing multiple message format communication of FIG. 1.

Referring to FIG. 8, for the sake of example, the system 100 is presented in a functional representation 800, including a client tier 802, presentation tier 804, business logic tier 806, integration tier 808 and resource tier 810. The client tier 802 may include the inbound queues 110 and 113, the outbound queue 132 and the on demand adapter 102. The presentation tier 804 may include IMH 108, a parser 812 and a serializer 814. The business logic tier 806 may include a router 816, a transformer 818 and a scheduler 820. The integration tier 808 may include the DAL 140, which may include the augmenter 128 and the recorder 126. The resource tier 810 may include the SODA 142 and directory 111.

In an exemplary embodiment, parser 812 may convert inbound messages from the message wire format to the system 100 format and may be performed by MTE 118. In an exemplary embodiment, serializer 814 may convert messages in system 100 format to a semantically-equivalent wire format for outbound messages and may be performed by MTE 118. In an exemplary embodiment, transformer 818 may translate one message data format into another so that it may be used in a different context and may be performed by MTE 118. Such translation may also involve augmenting the message with additional data. In an exemplary embodiment, scheduler 820 may create and send specific messages to inbound message queue 108 at configurable times and optionally at repeating intervals and may be performed by timer daemon 160 and event registry 162.

In an exemplary embodiment, the application, platform and infrastructure associated with the client tier 802, the presentation tier 804, the business logic tier 806, the integration tier 808 and the resource tier 810 may be as set forth in the table below:

| | Client | Presentation | Business Logic | Integration | Resource |
|---|---|---|---|---|---|
| Application | Queues, topics and Java application | Data transformation scripts and Message-Driven Beans | Message flows | Message flows | Relational tables |
| Platform | WebSphere MQ and J2SE | ItemField ContentMaster and WebSphere Application Server | WebSphere Business Integration Message Broker | WebSphere Business Integration Message Broker | Oracle |
| Infrastructure | Solaris/ Sun 4900 | Solaris/ Sun 4900 | Solaris/ Sun 4900 | Solaris/ Sun 4900 | Solaris/ Sun 4900 |

Methods for implementing each entry in the table are known to those of ordinary skill in the art.

In an exemplary embodiment, the mechanism, container, platform and application interface (API) associated with the client tier 802, the presentation tier 804, the business logic tier 806, the integration tier 808 and the resource tier 810 may be as set forth in the table below:

| Tier | Mechanism | Container | Platform | API |
|---|---|---|---|---|
| Client | Assured message delivery | MQ | WebSphere | JMS |
| | Logging | J2SE 1.4 | Java | Thin extension of Java Logging API |
| Presentation | Parsing/ Serialization | ContentMaster/ Compute Node in Broker | WebSphere | Implicit |
| | Logging | J2SE 1.4 | Java | Thin extension of Java Logging API |
| Business Logic | Routing | Broker | WebSphere | Implicit |
| | Scheduling | WBI Server Foundation 5.1 | WebSphere | |
| | Logging | | | |
| Integration | Data Access | Compute Node in Broker | WebSphere | Implicit |
| | Logging | | | |
| Resource | Persistence | Oracle | Relational Database | ODBC/SQL |
| | Directory | WAS | WebSphere | JNDI/LDAP |

Methods for implementing each entry in the table are known to those of ordinary skill in the art.

Figure 9:
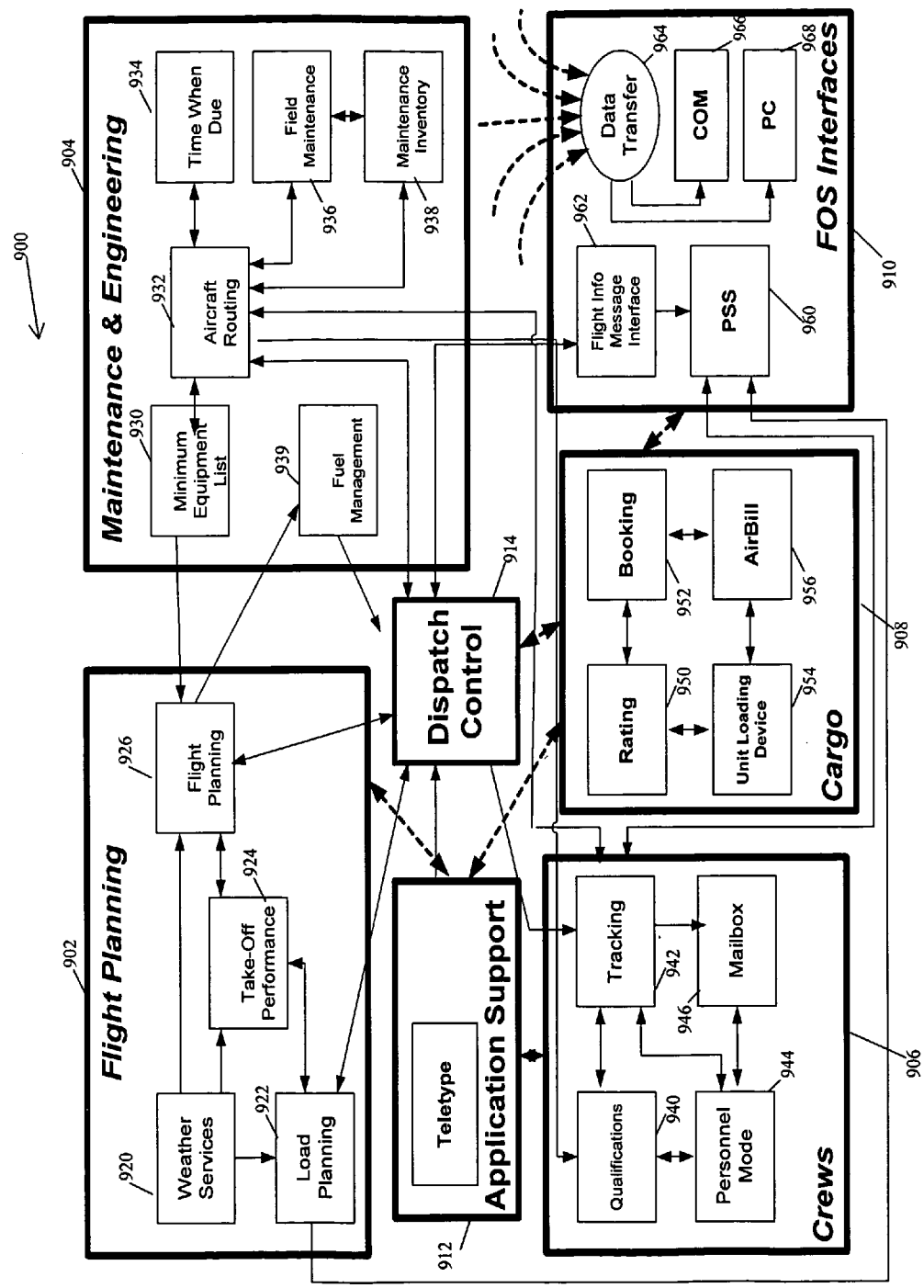
FIG. 9 is a schematic illustration of at least a portion of an exemplary embodiment of a flight operations system.

Referring to FIG. 9, in an exemplary embodiment, flight operation system (FOS) 900, which may be implemented in a fully customized environment on a proprietary mainframe, may utilize system 100 to provide a flexible messaging platform that will facilitate the interchange of data between a diverse set of applications connected to it and provide the ability to migrate certain functionality away from the proprietary environment. For example, FOS may represent the legacy application 174 in the system 100. FOS may comprise the following functional components: flight planning 902, maintenance and engineering 904, crews 906, cargo 908, FOS interface 910, application support 912 and dispatch control 914.

In an exemplary embodiment, flight planning component 902 may manage flights for a particular airline. Flight planning component 902 may process weather services information 920, load planning information 922, take-off performance information 924 and flight planning information 926 and interface with the other functional components of FOS 900, either directly or indirectly.

In an exemplary embodiment, maintenance and engineering component 904 may manage the maintenance and services for aircraft and associated equipment utilized by a particular airline. The maintenance and engineering 904 may process minimum equipment list information 930, aircraft routing information 932, time when due information 934, field maintenance information 936, maintenance inventory information 938, and fuel management information 939 and interface with the other functional components of FOS 900, either directly or indirectly.

In an exemplary embodiment, crews component 906 may manage the crew assignments for flights associated with a particular airline. Crews component 906 may process qualifications information 940, tracking information 942, personnel mode information 944 and flight mailbox information 946 and interface with the other functional components of FOS 900, either directly or indirectly.

In an exemplary embodiment, cargo component 908 may manage cargo tracking on flights associated with a particular airline. Cargo component 908 may process rating information 950, booking information 952, unit loading device information 954 and airbill information 956 and interface with the other functional components of FOS 900, either directly or indirectly.

In an exemplary embodiment, FOS interface component 910 may manage the interface between the FOS 900 components. FOS interface component 910 may process passenger reservations and handling information 960, flight info message interface information 962, and inbound data 954 through communications port 966 and pc 968 and interface with the other functional components of FOS 900, either directly or indirectly.

Figure 10:
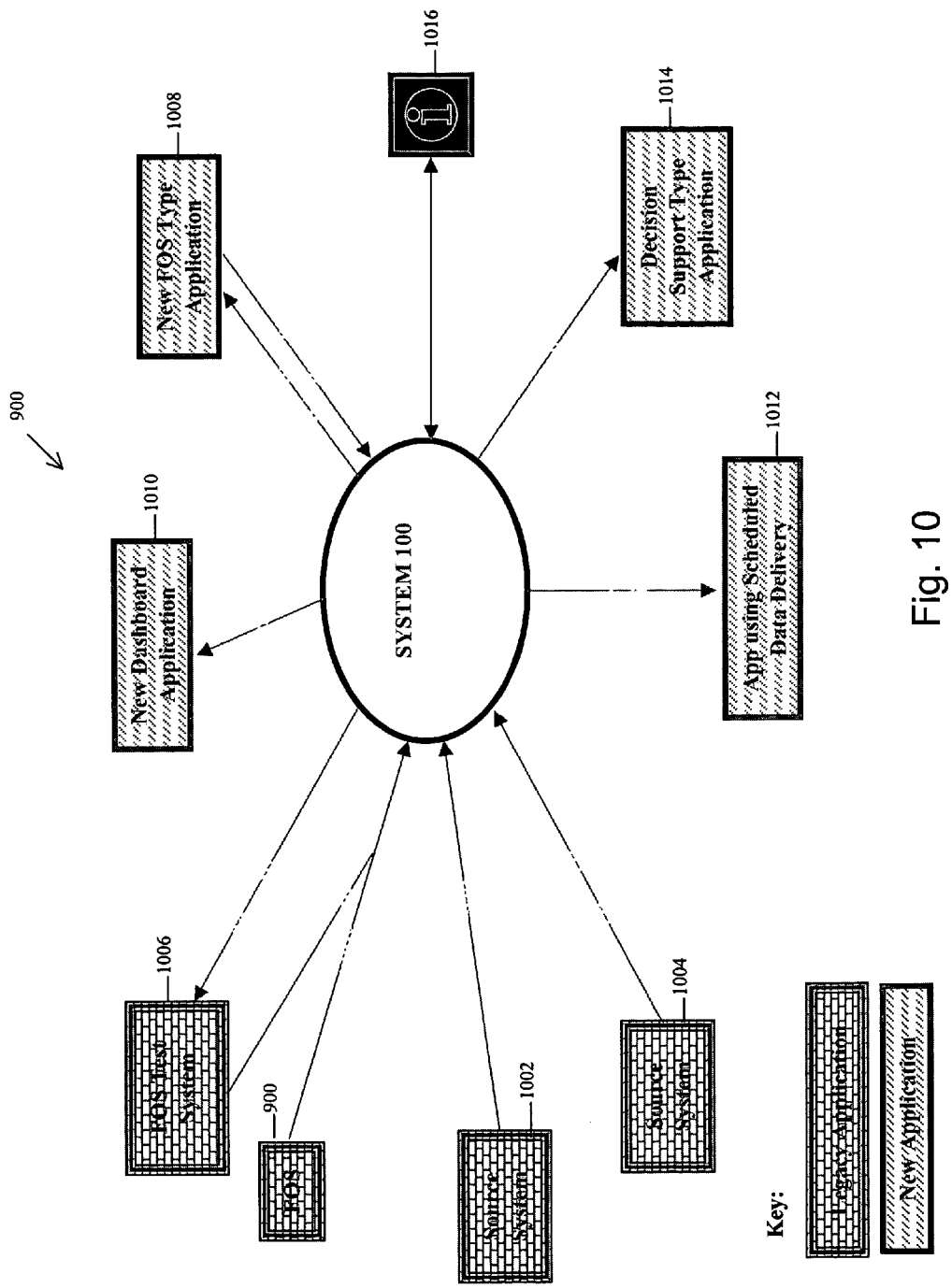
FIG. 10 is a schematic illustration of at least a portion of an exemplary embodiment of a message management system utilizing the system of FIG. 1.

Referring to FIG. 10, in an exemplary embodiment, an integrated system 1000 utilizing system 100 is illustrated. FOS 900 may be integrated with other applications, such as for example, source systems 1002 and 1004 and FOS test system 1006. In an exemplary embodiment, components of FOS 900 may be migrated off of the proprietary platform and replaced with off-the-shelf (OTS) components, such as, for example, new FOS type application 1008 through system 100. In an exemplary embodiment, any type of application, such as, for example, a new dashboard application 1010, application using scheduled data delivery 1012, a decision support type application 1014 and an internet application 1016, may be integrated together utilizing system 100. Utilizing the system 100 in this way may provide many benefits, such as, for example: a broader set of functionality; quicker time to initial production; higher quality, due to the maturity of purchased products, having been exercised by numerous customers around the world over the course of many years; and lower costs, since vendors can spread the cost of activities such as gathering requirements, architecting, coding, testing, documenting, and maintaining across customers.

It will also be understood by those having skill in the art that one or more (including all) of the elements/steps of the present invention may be implemented using software executed on a general purpose computer system or networked computer systems, using special purpose hardware-based computer systems, or using combinations of special purpose hardware and software. An illustrative node for implementing an embodiment of the method includes a microprocessor, an input device, a storage device, a video controller, a system memory, and a display, and a communication device all interconnected by one or more buses. The storage device could be a floppy drive, hard drive, CD-ROM, optical drive, or any other form of storage device. In addition, the storage device may be capable of receiving a floppy disk, CD-ROM, DVD-ROM, or any other form of computer-readable medium that may contain computer-executable instructions. Further communication device could be a modem, network card, or any other device to enable the node to communicate with other nodes. It is understood that any node could represent a plurality of interconnected (whether by intranet or Internet) computer systems, including without limitation, personal computers, mainframes, PDAs, and cell phones.

A computer system typically includes at least hardware capable of executing machine readable instructions, as well as the software for executing acts (typically machine-readable instructions) that produce a desired result. In addition, a computer system may include hybrids of hardware and software, as well as computer sub-systems.

Hardware generally includes at least processor-capable platforms, such as client-machines (also known as personal computers or servers), and hand-held processing devices (such as smart phones, personal digital assistants (PDAs), or personal computing devices (PCDs), for example). Further, hardware may include any physical device that is capable of storing machine-readable instructions, such as memory or other data storage devices. Other forms of hardware include hardware sub-systems, including transfer devices such as modems, modem cards, ports, and port cards, for example.

Software includes any machine code stored in any memory medium, such as RAM or ROM, and machine code stored on other devices (such as floppy disks, flash memory, or a CD ROM, for example). Software may include source or object code, for example. In addition, software encompasses any set of instructions capable of being executed in a client machine or server.

Combinations of software and hardware could also be used for providing enhanced functionality and performance for certain embodiments of the disclosed invention. One example is to directly manufacture software functions into a silicon chip. Accordingly, it should be understood that combinations of hardware and software are also included within the definition of a computer system and are thus envisioned by the invention as possible equivalent structures and equivalent methods.

Computer-readable mediums include passive data storage, such as a random access memory (RAM) as well as semi-permanent data storage such as a compact disk read only memory (CD-ROM). In addition, an embodiment of the invention may be embodied in the RAM of a computer to transform a standard computer into a new specific computing machine.

Data structures are defined organizations of data that may enable an embodiment of the invention. For example, a data structure may provide an organization of data, or an organization of executable code. Data signals could be carried across transmission mediums and store and transport various data structures, and, thus, may be used to transport an embodiment of the invention.

The system may be designed to work on any specific architecture. For example, the system may be executed on a single computer, local area networks, client-server networks, wide area networks, internets, hand-held and other portable and wireless devices and networks.

A database may be any standard or proprietary database software, such as Oracle, Microsoft Access, SyBase, or DBase II, for example. The database may have fields, records, data, and other database elements that may be associated through database specific software. Additionally, data may be mapped. Mapping is the process of associating one data entry with another data entry. For example, the data contained in the location of a character file can be mapped to a field in a second table. The physical location of the database is not limiting, and the database may be distributed. For example, the database may exist remotely from the server, and run on a separate platform. Further, the database may be accessible across the Internet. Note that more than one database may be implemented.

In one embodiment, a method of handling messages comprises receiving a first message in a first format from a first source, identifying an action within the first message and a response destination, creating a second message in response to the action, augmenting the second message with data associated with a second source, and sending the second message to the response destination.

In another embodiment, a system for handling messages comprises a message module capable of receiving a first message from a first source, a message creation module in communication with a memory, wherein the memory contains data associated with a second source, and wherein the message creation module is capable of creating, in response to the first message, a second message with the data; and a message handler capable of sending the second message to a response destination.

In a further embodiment, a method for handling messages is implemented through a sequence of instructions on a computer-readable medium. In this embodiment, the method comprises receiving a first message in a first format from a first source, identifying an action within the first message and a response destination, creating a second message in response to the action, augmenting the second message with data associated with a second source, and sending the second message to the response destination.

In yet another embodiment, a method of handling messages comprises accessing data in a first source and storing the data in a memory, receiving a first message in a first format from a second source, identifying an action within the first message and a response destination, determining a location of the data, creating a second message in response to the action using the data, transforming the second message into a format associated with the response destination, and sending the second message to the response destination.

The foregoing has outlined features of several embodiments according to aspects of the present disclosure. Those skilled in the art should appreciate that they may readily use the present disclosure as a basis for designing or modifying other processes and systems for carrying out the same purposes and/or achieving the same advantages of the embodiments introduced herein. Those skilled in the art should also realize that such equivalent constructions do not depart from the spirit or scope of the present disclosure, and that they may make various changes, substitutions and alterations herein without departing from the spirit or scope of the present disclosure.

What is claimed is:

1. A method of handling messages, the method comprising:
receiving a first message from a first source with a message handling system, the first message having a first message format and a header, the message handling system comprising a first node, the first node comprising a microprocessor and a first memory operably coupled thereto;
wherein the first message is to be sent to a destination application with which a second message format is associated, the destination application comprising a second node, the second node comprising a second memory; and
wherein the first message format is incompatible with the second message format and thus the first message is incompatible with, and is unable to be received by, the destination application;
placing the first message on a first queue stored in the first node;
creating a second message with the first node so that the second message is associated with the second message format and thus the second message is compatible with, and is able to be received by, the destination application, wherein creating the second message comprises:
processing the first message with an inbound message handler stored in the first node and operably coupled to the first queue, comprising:
accessing a routing and formatting table stored in the first node and operably coupled to the inbound message handler;
gathering routing and formatting information from the routing and formatting table; and
placing the routing and formatting information in the header of the first message;
and
transforming the first message with a message transformation engine stored in the first node and operably coupled to the inbound message handler, comprising:
inspecting the header of the first message;
accessing a format rules repository stored in the first node and operably coupled to the message transformation engine;
gathering at least one format rule defining the second message format from the format rules repository, the at least one format rule being dependent upon at least the routing and formatting information in the header of the first message, the routing and formatting information in the header of the first message indicating the at least one format rule and thus the second message format necessary for compatibility with the destination application; and
transforming the first message in accordance with the at least one format rule to thereby create the second message, the second message having the second message format that is defined by the at least one format rule and thus by the routing and formatting information in the header of the first message so that the second message is compatible with, and is able to be received by, the destination application;
placing the second message on a second queue stored in the first node and operably coupled to the message transformation engine; and
sending the second message to the destination application.

2. The method of claim 1, further comprising:
augmenting the second message with data associated with a second source; and
retrieving the data from a third memory separate from the second source.

3. The method of claim 1, further comprising:
augmenting the second message with data associated with a second source;
testing the availability of the data;
retrieving the data from the second source; and
storing the data in a database.

4. The method of claim 1, further comprising:
augmenting the second message with data associated with a second source; and
periodically accessing predetermined data in the second source and storing the predetermined data in a database.

5. The method of claim 1, further comprising:
augmenting the second message with data associated with a second source;
determining a location of the data; and
accessing the data from the location.

6. The method of the claim 5, wherein the location is the second source.

7. The method of claim 1 wherein transforming the first message with the message transformation engine further comprises:
accessing a database through a data access layer, the database and the data access layer being stored in the first node, the data access layer being operably coupled between the message transformation engine and the database;
determining whether augmentation data is present in the database; and
if the augmentation data is present in the database, then augmenting the second message with the augmentation data before placing the second message on the second queue.

8. The method of claim 7 wherein the first source is a source application comprising a third node, the third node comprising a third memory;
wherein the method further comprises determining whether the first message is authenticated before placing the first message on the first queue, comprising verifying that the source application is authorized to access the message handling system; and
wherein transforming the first message with the message transformation engine further comprises determining whether augmentation of the second message is required before determining whether the augmentation data is present in the database.

9. The method of claim 8 wherein the source application is an on-demand application and the first message is an on-demand message having a first protocol associated with the on-demand application;
wherein an on-demand adapter is stored in the first node of the message handling system and is operably coupled to the inbound message handler and to the message transformation engine; and
wherein receiving the first message from the first source comprises:
receiving the first message from the on-demand application through the on-demand adapter; and
converting the first protocol into a second protocol with the on-demand adapter, the second protocol being associated with the first queue.

10. The method of claim 9 wherein the source application is a publishing application; and
wherein the method further comprises:
determining whether data from the publishing application should be stored in the database; and
if the data from the publishing application should be stored in the database, then storing the data from the publishing application in the database.

11. The method of claim 7 wherein the first source is an event registry stored in the first node;
wherein the method further comprises determining whether it is time for a message event; and
wherein the first message is received and placed on the first queue after it is determined that it is time for the message event.

12. The method of claim 1 wherein the first source is a source application comprising a third node, the third node comprising a third memory;
wherein the first message includes data;
wherein the second message includes the data; and
wherein the method further comprises storing the data included in the second message in a database after placing the second message on the second queue, the database being stored in the first node and operably coupled to the message transformation engine.

13. The method of claim 12 wherein the source application is a flight operation system comprising:
a flight planning functional component stored in the third node for processing flight planning information for flights of an airline, the flights employing aircraft;
a maintenance and engineering functional component stored in the third node for managing the maintenance of the aircraft;
a crews functional component stored in the third node for managing crew assignments for the flights of the airline;
a cargo functional component stored in the third node for managing cargo tracking of cargo on the flights of the airline;
an interface functional component stored in the third node for managing the interface between at least the flight planning, maintenance and engineering, crews and cargo functional components;
an application support functional component stored in the third node; and
a dispatch control functional component stored in the third node, each of the flight planning, maintenance and engineering, crews, cargo, interface and application support functional components being operably coupled to the dispatch control functional component.

14. The method of claim 1, wherein the first source is selected from the group consisting of an on-demand application, a scheduled event indicator, a publishing application, and an airline flight operations system.

15. The method of claim 1,
wherein the destination application is selected from the group consisting of an on-demand application, a subscriber application, and a consumer application.

16. A computer-readable medium that is non-transitory, the computer-readable medium having stored thereon sequences of instructions for handling messages, the sequences of instructions comprising:
instructions for receiving a first message from a first source with a message handling system, the first message having a first message format and a header, the message handling system comprising a first node, the first node comprising a microprocessor and a first memory operably coupled thereto;
wherein the first message is to be sent to a destination application with which a second message format is associated, the destination application comprising a second node, the second node comprising a second memory; and
wherein the first message format is incompatible with the second message format and thus the first message is incompatible with, and is unable to be received by, the destination application;
instructions for placing the first message on a first queue stored in the first node;
instructions for creating a second message with the first node so that the second message is associated with the second message format and thus the second message is compatible with, and is able to be received by, the destination application, wherein instructions for creating the second message comprise:

instructions for processing the first message with an inbound message handler stored in the first node and operably coupled to the first queue, comprising:
    instructions for accessing a routing and formatting table stored in the first node and operably coupled to the inbound message handler;
    instructions for gathering routing and formatting information from the routing and formatting table; and
    instructions for placing the routing and formatting information in the header of the first message;
and
instructions for transforming the first message with a message transformation engine stored in the first node and operably coupled to the inbound message handler, comprising:
    instructions for inspecting the header of the first message;
    instructions for accessing a format rules repository stored in the first node and operably coupled to the message transformation engine;
    instructions for gathering at least one format rule defining the second message format from the format rules repository, the at least one format rule being dependent upon at least the routing and formatting information in the header of the first message, the routing and formatting information in the header of the first message indicating the at least one format rule and thus the second message format necessary for compatibility with the destination application; and
    instructions for transforming the first message in accordance with the at least one format rule to thereby create the second message, the second message having the second message format that is defined by the at least one format rule and thus by the routing and formatting information in the header of the first message so that the second message is compatible with, and is able to be received by, the destination application;
instructions for placing the second message on a second queue stored in the first node and operably coupled to the message transformation engine; and
instructions for sending the second message to the destination application.

17. The computer-readable medium of claim 16, wherein the first source comprises an on-demand application.

18. The computer-readable medium of claim 16, wherein the first source comprises a scheduled event indicator.

19. The computer-readable medium of claim 16, wherein the first source comprises a publishing application.

20. The computer-readable medium of claim 16, wherein the destination application comprises an on-demand application.

21. The computer-readable medium of claim 16, wherein the destination application comprises multiple applications.

22. The computer-readable medium of claim 16, wherein the destination application comprises at least one subscriber application.

23. The computer-readable medium of claim 16, wherein the destination application comprises at least one consumer application.

24. The computer-readable medium of claim 16, wherein the first message comprises a request to gather information.

25. The computer-readable medium of claim 16, wherein the first message comprises a request to deliver published messages.

26. The computer-readable medium of claim 16, wherein the first message comprises a request to deliver scheduled messages.

27. The computer-readable medium of claim 16, wherein the first source comprises an airline flight operations system.

28. The computer-readable medium of claim 16, wherein the sequences of instructions further comprise:
    instructions for augmenting the second message with data associated with a second source;
    instructions for testing the availability of the data in a third memory;
    instructions for accessing the data from the second source when the data is not available in the third memory; and
    instructions for storing the data in the third memory.

29. The computer-readable medium of claim 16, wherein the instructions for transforming the first message with the message transformation engine further comprise:
    instructions for accessing a database through a data access layer, the database and the data access layer being stored in the first node, the data access layer being operably coupled between the message transformation engine and the database;
    instructions for determining whether augmentation data is present in the database; and
    instructions for if the augmentation data is present in the database, then augmenting the second message with the augmentation data before placing the second message on the second queue.

30. The computer-readable medium of claim 29 wherein the first source is a source application comprising a third node, the third node comprising a third memory;
    wherein the sequences of instructions further comprise instructions for determining whether the first message is authenticated before placing the first message on the first queue, comprising instructions for verifying that the source application is authorized to access the message handling system; and
    wherein the instructions for transforming the first message with the message transformation engine further comprise instructions for determining whether augmentation of the second message is required before determining whether the augmentation data is present in the database.

31. The computer-readable medium of claim 30 wherein the source application is an on-demand application and the first message is an on-demand message having a first protocol associated with the on-demand application;
    wherein an on-demand adapter is stored in the first node of the message handling system and is operably coupled to the inbound message handler and to the message transformation engine; and
    wherein instructions for receiving the first message from the first source comprise:
        instructions for receiving the first message from the on-demand application through the on-demand adapter; and
        instructions for converting the first protocol into a second protocol with the on-demand adapter, the second protocol being associated with the first queue.

32. The computer-readable medium of claim 30 wherein the source application is a publishing application; and
wherein the sequences of instructions further comprise:
instructions for determining whether data from the publishing application should be stored in the database; and
instructions for if the data from the publishing application should be stored in the database, then storing the data from the publishing application in the database.

33. The computer-readable medium of claim 29 wherein the first source is an event registry stored in the first node;
wherein the sequences of instructions further comprise instructions for determining whether it is time for a message event; and
wherein the first message is received and placed on the first queue after it is determined that it is time for the message event.

34. The computer-readable medium of claim 16 wherein the first source is a source application comprising a third node, the third node comprising a third memory;
wherein the first message includes data;
wherein the second message includes the data; and
wherein the sequences of instructions further comprise instructions for storing the data included in the second message in a database after placing the second message on the second queue, the database being stored in the first node and operably coupled to the message transformation engine.

35. The computer-readable medium of claim 34 wherein the source application is a flight operation system comprising:
a flight planning functional component stored in the third node for processing flight planning information for flights of an airline, the flights employing aircraft;
a maintenance and engineering functional component stored in the third node for managing the maintenance of the aircraft;
a crews functional component stored in the third node for managing crew assignments for the flights of the airline;
a cargo functional component stored in the third node for managing cargo tracking of cargo on the flights of the airline;
an interface functional component stored in the third node for managing the interface between at least the flight planning, maintenance and engineering, crews and cargo functional components;
an application support functional component stored in the third node; and
a dispatch control functional component stored in the third node, each of the flight planning, maintenance and engineering, crews, cargo, interface and application support functional components being operably coupled to the dispatch control functional component.

* * * * *